US011233776B1

(12) United States Patent
Muddapappu et al.

(10) Patent No.: US 11,233,776 B1
(45) Date of Patent: Jan. 25, 2022

(54) PROVIDING CONTENT INCLUDING SENSITIVE DATA

(71) Applicant: Amazon Technologies, Inc., Reno, NV (US)

(72) Inventors: Sarath Chandra Murthy Muddapappu, Redmond, WA (US); Sajeeva Lakmal Bandara Pallemulle, Woodinville, WA (US); Camilla De Oliveira Penna Tavares, Seattle, WA (US); Justin Jon Derby, Seattle, WA (US); Joel William Weisman, Seattle, WA (US); Leonardo Davi Viccari, Shoreline, WA (US); Kartikey Bhatt, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/800,417

(22) Filed: Nov. 1, 2017

(51) Int. Cl.
*G06F 21/31* (2013.01)
*H04L 29/06* (2006.01)
*G06F 21/36* (2013.01)

(52) U.S. Cl.
CPC .......... *H04L 63/0457* (2013.01); *G06F 21/31* (2013.01); *G06F 21/36* (2013.01); *H04L 63/0272* (2013.01); *H04L 63/0428* (2013.01); *H04L 63/123* (2013.01)

(58) Field of Classification Search
None
See application file for complete search history.

(56) References Cited

U.S. PATENT DOCUMENTS

| 9,225,690 | B1* | 12/2015 | Fitch | H04L 63/0428 |
| 2004/0021549 | A1* | 2/2004 | Choi | G06F 21/10 |
| | | | | 340/5.8 |
| 2005/0022012 | A1* | 1/2005 | Bluestone | G06F 21/53 |
| | | | | 726/4 |
| 2007/0073817 | A1* | 3/2007 | Gorty | G06F 21/33 |
| | | | | 709/206 |
| 2007/0169171 | A1* | 7/2007 | Kumar | H04L 63/08 |
| | | | | 726/2 |
| 2007/0220010 | A1* | 9/2007 | Ertugrul | G06F 16/9535 |
| 2008/0002911 | A1* | 1/2008 | Eisen | H04N 1/00872 |
| | | | | 382/283 |
| 2008/0112405 | A1* | 5/2008 | Cholas | H04L 63/062 |
| | | | | 370/389 |
| 2012/0084846 | A1* | 4/2012 | Weis | G06F 21/34 |
| | | | | 726/6 |

(Continued)

*Primary Examiner* — Jason Chiang
(74) *Attorney, Agent, or Firm* — Hogan Lovells US LLP

(57) ABSTRACT

An agent can be installed that is separate from an unsecure application, such as a third party browser, executing on a client device. Content to be displayed by, or accessible to, the application can be rendered or determined remotely, such that only unrestricted data is received by the application. Restricted data to be stored on the device, as may include one or more authentication credentials, can be transmitted over a secure connection to the agent, which can store the sensitive information to a secure location on the client device that is inaccessible to the application. Such management allows the sensitive information to be stored on the client device and provided with requests for restricted data, for example, while preventing the restricted data from being exposed to the application on the client device.

19 Claims, 5 Drawing Sheets

(56) References Cited

U.S. PATENT DOCUMENTS

| | | | | |
|---|---|---|---|---|
| 2012/0260321 A1* | 10/2012 | Wendt | ................... | H04L 9/0863 726/5 |
| 2013/0167250 A1* | 6/2013 | Balasubramanian | ... | G06F 21/10 726/28 |
| 2013/0212248 A1* | 8/2013 | Neafsey | ................. | G06F 21/45 709/223 |
| 2014/0047518 A1* | 2/2014 | Pravetz | ................... | H04L 63/08 726/5 |
| 2014/0130145 A1* | 5/2014 | Yeleswarapu | ........... | H04L 61/30 726/9 |
| 2014/0282880 A1* | 9/2014 | Herter | ..................... | H04L 63/08 726/4 |
| 2014/0325627 A1* | 10/2014 | Fee | ..................... | H04L 63/0807 726/7 |
| 2016/0323112 A1* | 11/2016 | Chung | ................. | H04L 63/083 |
| 2017/0041296 A1* | 2/2017 | Ford | ..................... | G06F 16/951 |
| 2017/0094510 A1* | 3/2017 | Khosravi | ................ | G06F 21/32 |
| 2019/0132293 A1* | 5/2019 | De Beer | ............. | H04L 63/0428 |

\* cited by examiner

PROVIDING CONTENT INCLUDING SENSITIVE DATA

BACKGROUND

Users are increasingly performing tasks using a variety of computing resources, including portable devices such as tablet computers and smartphones. Users can often conveniently access content, including work-related content, from these devices. It might be the case, however, that work-related or other sensitive content may require levels of security that are not supported by the browsers of the users' devices. Thus, users are either prevented from using these devices for access, or are required to use specific software to access the content, which can be restrictive and at least inconvenient for many users.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to managing access to content in an electronic environment. In particular, various approaches utilize an agent on a client device that is separate from an unsecure application, such as a third party browser, executing on the client device. Content to be displayed via the application can be rendered or identified remotely, such that only unrestricted data is received by the application. Sensitive information, or restricted data, to be stored on the device may include one or more authentication credentials. The restricted data can be transmitted over a secure connection to the agent, which can store the restricted data to a secure location on the client device that is inaccessible to the application. This allows the sensitive information to be stored on the client device and provided with requests for restricted content, for example, while preventing the restricted content or sensitive information from being exposed to the application on the client device.

Various other such functions can be used as well within the scope of the various embodiments as would be apparent to one of ordinary skill in the art in light of the teachings and suggestions contained herein.

Figure 1:
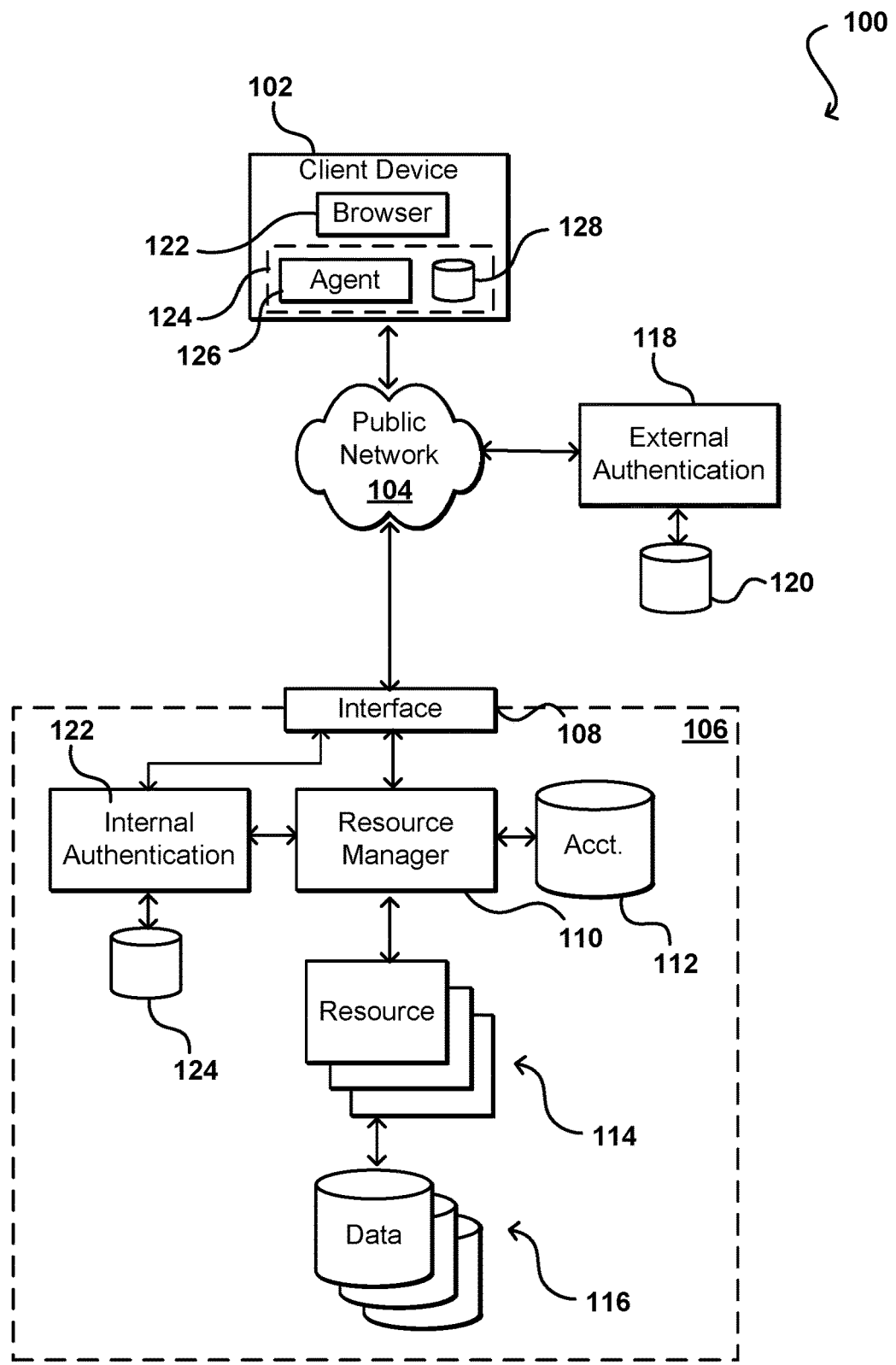
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104, in this case a public network, to a resource provider environment 106. The client device 102 can include any appropriate electronic device operable to send and receive requests, messages, or other such information over an appropriate network and convey information back to the device. Examples of such client devices include personal computers, tablet computers, smart phones, notebook computers, and the like. The network(s) 104 can include any appropriate network, including an intranet, the Internet, a cellular network, a local area network (LAN), or any other such network or combination, and communication over the network can be enabled via wired and/or wireless connections. The resource provider environment 106, such as may take the form of a multi-tenant resource environment or "cloud" computing environment in some embodiments, can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, network services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114, or access data stored or processed by these resources, can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. As illustrated, the components of the interface layer 108 can be internal or external to the provider environment 106, or a combination thereof. When a request to utilize a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

In some embodiments the resource manager can work with an authentication service (or other such system, device, component, or process) for authenticating a user request using the provided information and/or credentials. The authentication service can validate this information against information stored for the user. If the user has an account with the appropriate permissions, status, etc., and the provided information and credentials match those stored for the account, then the authentication service can provide authentication of the request, such as by issuing a token or ticket that can be passed with requests for that user, device, or session to obtain access to various resources in the provider environment 106. The resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options. In the case of a VPN request, the resource manager can allocate and configure a VPN connection such that VPN software executing on the client device 102 can access the resources in the provider environment 106 as if the client were directly connected to those resources inside the provider environment. The token or ticket can be passed with requests on the VPN session in order to indicate authentication and obtain permitted access to the resources.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys and certificates issued as well as the user to which they were issued.

The resource manager 110 (or another such system or service) in this example can also function as a virtual layer of hardware and software components that handles control functions in addition to management actions, as may include provisioning, scaling, replication, etc. The resource manager can utilize dedicated APIs provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of a pool of servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, when the client device gains access to the resources 114 and data stores 116 of the resource provider environment 106 through a secure connection, such as a VPN connection, the client device 102 can utilize internal machines, services, and websites, among other offerings, of the resource provider environment. This can include, for example, an employee accessing network resources of an employer from an offsite location through a public network, such as the Internet. The internal network and resources of the provider environment 106 will often be protected through physical security to prevent access to the resources 110 within the network. The environment may also be protected through software-based security to prevent external network traffic from reaching into the network, as well as preventing unauthenticated users from accessing private data stored in the environment 106. In order for the client device to access the network when the device cannot access physical network wiring or routers of the environment, the client device can establish a VPN to connect. Once authenticated with a VPN server, which can be the same as or separate from the resource manager and authentication service, the client device is permitted to make requests to internal network servers via a VPN tunnel established as part of the VPN session. Once on the network, however, the client device may still not be allowed access to most data without appropriate authentication. This can include identification of users as they access data, for auditing and other purposes, as well as authorization of actions taken by those users on the various systems.

It might be the case that an attacker, such as a hacker or an automated process (e.g., a botnet) can obtain access to the provider network through a VPN connection, which by its nature is accessible on an open, public network such as the Internet. It is also possible that if the user uses a conventional browser application 122 on the client device to access the resources or content that a hacker or other unauthorized or malicious entity or process can obtain the credentials or other authentication mechanisms that can be used to obtain access to the resources of the provider environment 106.

Accordingly, approaches in accordance with various embodiments attempt to minimize the ability for an unauthorized entity to gain access to sensitive information through use of a separate security agent, referred to herein as an authentication agent 124, on the relevant client device 102. The authentication agent can be any appropriate software, hardware, or module on the client device configured to manage sensitive and secure storage, as well as other functionality, as discussed and suggested herein. The user can utilize a conventional browser 122, or other potentially non-secure application, to access content, such as rendered content, that does not include the underlying sensitive information. In at least some embodiments, the content to be displayed via the browser 122 will be rendered by one of the resources 114 in the provider environment 106 instead of on the client device, such that only the image data is available on the client device. Any sensitive information (other than what might be determinable from the image data) would not be available to, or via, the browser application 122. Retaining all the sensitive data in a repository in the provider environment 106, however, would provide a valuable target for a data breach or attack. Thus, it can be desirable in at least some embodiments to enable the client device 102 to store the sensitive data, such as authentication information, while making that data inaccessible to the browser or other potentially unsecure applications or components on the client device.

The example client device 102 illustrated in FIG. 1 has a secure environment 124 configured that includes components such as an authentication agent 126 and a secure data store 128. It should be understood that the secure data store can be a separate component or a secure partition of memory or storage on the client device, among other such options. The secure environment 124 can be used to manage and store sensitive information on the client device, while the browser 122 can enable a user to access restricted content, such as corporate content, using a conventional application that is convenient and/or personalized for the user. This could be, for example, the default Web browser of choice of the particular user, where each user can utilize a different or customized browser to access the restricted content from a variety of devices. The use of an authentication agent 126 that is managed by the provider also provides the ability for the provider to adjust the security of the stored data, as well as to be able to delete the data from the device if necessary. As mentioned, the restricted content can be any content that is not to be made accessible to a specific application, or outside a specific environment, as may relate to any information behind a login page or any data where access is determined by at least one security policy, among other such options. Rules for determining restricted data can analyze the data by criteria such as source domain, confidential content, data type, security tags, and the like. For example, any data coming from an authentication domain may be determine to be restricted in some embodiments.

Figure 2:
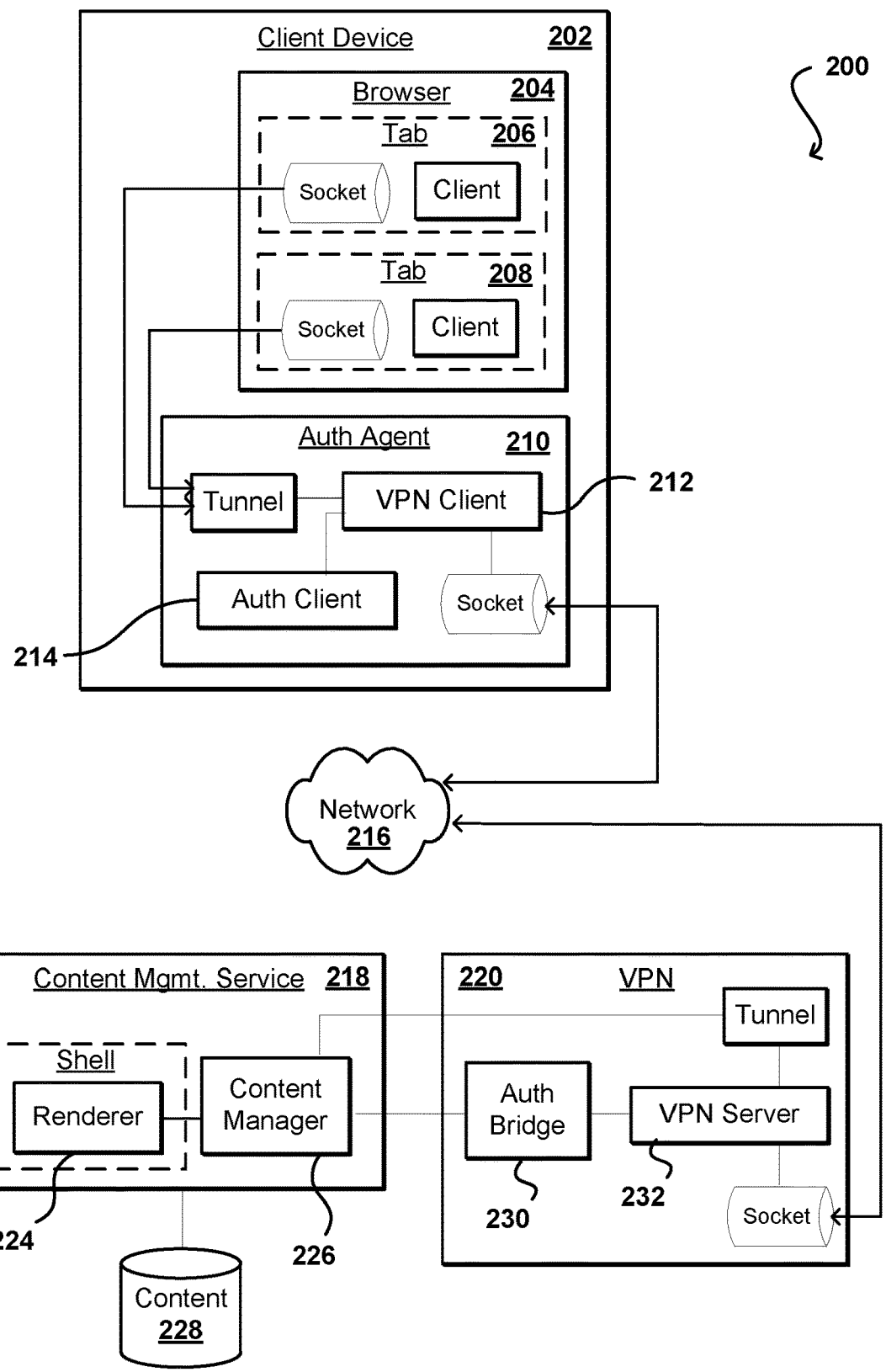
FIG. 2 illustrates example components that can be used to implement aspects of the various embodiments.

FIG. 2 illustrates a system 200 including various components that can be used to implement such functionality in an environment such as that illustrated with respect to FIG. 1. In this example, a content management service 218 is provided using resources of a resource provider environment. This can include, for example, a set of servers operable to obtain content 228 requested by a tab 206, 208 of a browser application 204 executing on a client device 202, and render the view of the content to be displayed through the respective tab. As mentioned, the image data transmitted will be only a visual representation and will not include any of the underlying content, which may include or be associated with sensitive data. This can include, for example, authentication information needed to obtain access to the underlying content. As mentioned, however, the actual browser application will only receive the image data to be displayed in response to the request.

When loading a page of content on a rendering server, the user data would typically be synchronized back to the browser and JavaScript engine running on the client device 202. An example of the user data is a Web cookie that could be transmitted with, or available for, requests sent from the client device, where the information in the cookie is used to verify that the user or device has been authenticated and is authorized to obtain access to the requested data. When the rendered page is sent to the client device 202, the cookie would be sent back with the response and will include any updates or changes so the client device has an accurate copy that can be used to obtain subsequent access. The updated cookies or credentials can then be reused for subsequent access requests. The content management service can maintain, or interact with, a synchronization mechanism that can synchronize the sensitive data back down to the client device 202, in this case to be stored in a secure repository managed by the authentication agent 210 on the client device. The maintenance of a synchronized authentication credential on the device provides for a seamless transition between displays of restricted and unrestricted content, as well as from standard content to pre-rendered content received from the content manager 226 of the content management service 218. As mentioned, synchronizing the authentication credentials with the browser 204 may not be desirable for an application such as an enterprise solution, as the browser may be untrusted or unsecure in that environment. By using a separate secure environment managed by the authentication agent 210, however, an untrusted browser 204 can still be used to display the rendered content while enabling the authentication information to be synchronized with the agent 210 on the client device. In this example the agent 210 resides separate from any third party untrusted browser application. The agent 210, which can include a dedicated authentication client 214, can use a VPN client 212 or other such component to receive the data over at least one public network 218 from the VPN service 220, or other such system, that provides access to the restricted content. The agent 210 can facilitate the connection to the content management service 218 through the VPN service 220, or otherwise, and can analyze the received information to extract and store the sensitive data, such as authentication information, to the authentication agent 214 while enabling the rendered image content to pass on to the relevant tab 206, 208, page, or other interface to be displayed via the browser application 204. In some embodiments, any received data that is not identified as sensitive, or otherwise managed by the agent 210, can also be passed to the browser application 204. Thus, the division in data flow enables the browser application to obtain the view of the target data without ever obtaining any of the underlying restricted data. The agent can receive any restricted data, which can be encrypted or otherwise secured on the device. In various embodiments, the browser application will not even be able to determine the existence of the sensitive data on the device. As mentioned, various other applications can take advantage of an agent on the client device for managing restricted data. For example, an email client application executing on a client device might require user credentials to be able to obtain email content, but may not be trusted or configured to manage user credentials. Accordingly, the agent can manage the credentials on behalf of the email client such that the application can be authenticated for email access without ever having direct access to the associated credentials.

As mentioned, the data stored by the authentication agent can be any sensitive information, in this example, that could be used as authentication or credential data, as may be useful to obtain access or determine permissions. This can include, for example, secure cookies, username/password pairs, Security Assertion Markup Language (SAML) tokens, Kerberos tickets, and the like. As known for such purposes, Kerberos tickets and other authentication mechanisms can be used to enable nodes communicating over a non-secure or public network to prove identity in a secure manner. As mentioned, any other sensitive or restricted information can be stored by the authentication agent 210 as well, such as may include employee information, confidential corporate information, and the like. In some embodiments, tags or rules can be set that can be used to identify data to be stored to the authentication agent, instead of being passed to the untrusted browser or other interface application. In other embodiments, only pre-rendered image data might be passed to the browser for some pages or responses, with any other data being stored by the authentication agent. In such cases, the decision logic may be contained within, or accessible to, the rendering fleet. Various other approaches for segregating sensitive from non-sensitive data can be utilized as well as would be obvious to one of ordinary skill in the art in light of the teachings and suggestions contained herein.

There can be two connections in one embodiment, a first connection that goes to the authentication agent 210 from the VPN service 220 and another one that goes to the browser 204. While in this example the browser connection is reached through the authentication agent 210, it should be understood that in other embodiments there can be a separate connection from the VPN service to the browser separate from the authentication agent 210. In some embodiments the connection to the browser is over a protocol such as the transport layer security (TLS) protocol that does not allow for inspection. In such cases, the convergence of the two connections can be at the rendering server 224 which would execute the data logic. It can also be necessary in some embodiments to tie the two connections together in such a way that it can be ensured that the data received on both connections is from the same device. In some embodiments the VPN service 220 can function as a custom VPN, where the VPN client manages custom connections to route at least the sensitive data to the authentication agent 210 on the client device, and can receive the content through an authentication bridge 230 to the content management service 218. An advantage to using such a VPN connection is that a single connection from the VPN service 220 to the client device 202 can be used to route multiple connections, such that a single tunnel can be made into the rendering fleet which can utilize the appropriate logic to separate the multiple connections as needed. This can include, for example, muxing and demuxing the data over a single pipe.

In some embodiments, the authentication client 214 of the authentication agent on the device 202 implements a specific protocol to connect to the renderer 224 of the content management service 218. The protocol can be used to send credentials or other sensitive data between the rendering server 224 and the client device 202. There can be various hooks in the browser application 204 that can ensure that the sensitive data from the rendering fleet is handled appropriately. For example, any relevant APIs can tunnel through a specific pipeline to the authentication agent 210 and never pass along to the browser application 204. Similarly, the authentication information can be sent from the authentication agent 210 to the rendering fleet for any request, whether being added to the response by the authentication agent or separately requested by the relevant rendering server 224. The sensitive data stored by the authentication agent on the device 202 can be stored in any appropriate location, although in at least some embodiments a minimum level or type of security might be required. As an example, a mobile device can have APIs in place to utilize a trusted hardware module for encryption and decryption operations. Such a module can be used to encrypt the sensitive data and store it to the file system on the device within the relevant application boundary, such that the data is not accessible from other applications on the device. In some embodiments a level of encryption can be applied as well, to account for possibility that the operating system is compromised. For example, a key management service (KMS) approach can be used that uses keys to encrypt and decrypt the data, such that encrypted data can be sent to the device to be stored by the agent, and then returned by the agent, with the decryption key never being available to the client device 202. HMAC or other verification mechanisms can be used as well in accordance with various embodiments.

As mentioned, the application used to display the content can be a web browser application in some embodiments that displays pre-rendered content. In other embodiments, other third party applications can be used to display or present the content, with sensitive data being stored to the secure agent or environment on the device. It might also be the case that a provider wants to provide a proprietary application for its users, but does not want to have to manage security and does not trust the various operating system installations on the untrusted devices. Accordingly, these providers can utilize the authentication agent to manage the sensitive information while keeping the sensitive information from the application and maintaining the information on the device itself. A login process, for example, might occur through the rendering fleet (or another such proxy or intermediary), with sensitive information then being stored to the authentication agent as discussed herein. In some embodiments the information could be stored within the application storage area on the client device, but encrypted so as to be inaccessible on the device.

In some embodiments a component such as a TCP proxy can be used as part of the network design. Instead of implementing the VPN protocol within the OS, a TCP server can listen on the device and route the connections accordingly. Instead of shuttling IP packets, the proxy utilizes a regular TCP connection and sits on the device itself to direct connections over a single pipe, as discussed with respect to a VPN implementation. A TCP proxy can potentially be open to any application on the device, however, such that a malicious application could potentially compromise the security of such an approach.

In some embodiments, credentials such as an authentication token provided by, or on behalf of, a user or client device can demonstrate that the source of a request for access has been authenticated, and can be used to verify that the source of the request is authorized to obtain, directly or indirectly, that access. This can include, for example, a resource or component in the resource provider environment assuming a role of the user, or customer of the resource provider environment, in order to act on behalf of the user. This has the advantage to the user that a client or other component for the user can obtain access to the resources to obtain a series of tasks, without having to provide the credentials, or obtain new credentials, for every task. A potential downside, however, is that an unauthorized third party gaining access to, or a copy of, the credentials can also use them to assume the role of the user, and thus obtain similar access to the resources of the resource provider environment. It thus can be desirable in at least some situations to limit access to these credentials in order to minimize the amount of "damage" that an unintended third party can do under the assumed role or obtained access.

Figure 3:
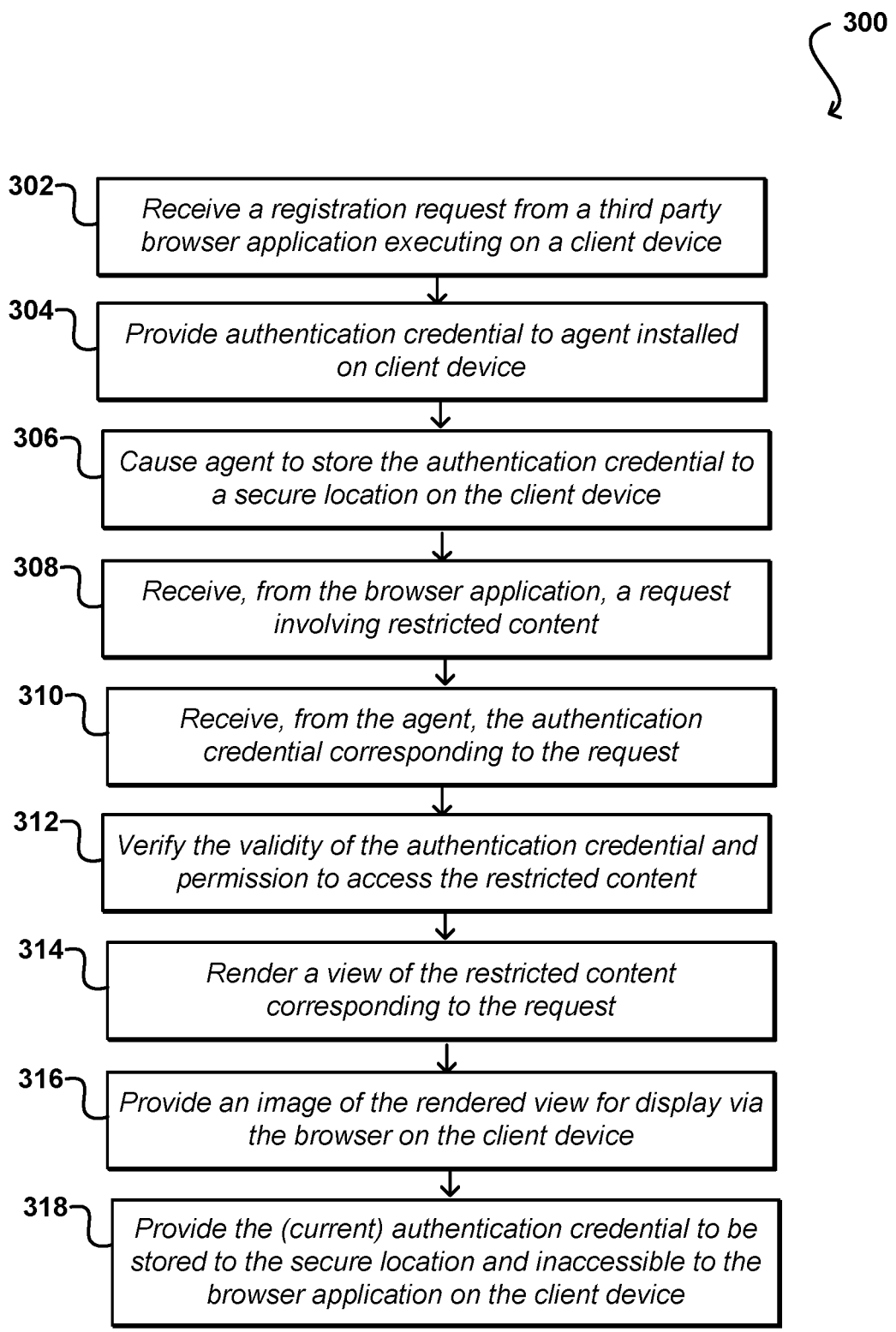
FIG. 3 illustrates an example process for managing sensitive data on a client device that can be utilized in accordance with various embodiments.

FIG. 3 illustrates an example process 300 for managing authentication credentials on a client device that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a registration request is received 302 from a third party browser application executing on a client device. This can include, for example, a username/password pair initially being entered as part of an account creation or access procedure, among other such options. In response to receiving the request, the provided information can be analyzed, such as through an authentication process as known for such purposes, to verify the identity of the requestor and ensure that the requestor is authorized to access content and/or resources provided by the system or service receiving the request. Once authenticated, at least one authentication credential can be generated for the requestor, where the credential can take any appropriate form such as a secure token, secure cookie, Kerberos ticket, and the like. The authentication credential can then be provided 304 to an agent installed on the client device. As mentioned herein, the agent can operate separately from the browser application on the client device, and can be configured to store the authentication credential in a secure location that is inaccessible to the browser application on the client device. The agent can then be caused 306 to store the authentication credential to the secure location on the client.

Subsequently, a request involving restricted content can be received 308 from the browser application. This can involve, for example, an interface page displaying rendered content derived from the restricted content, among other such options discussed and suggested herein. Along with the request, the corresponding authentication credential can be received 310 from the agent on the client device. As mentioned, the content request and credentials can be received together, as managed by the agent, or separately over one or more connections. In some embodiments the content request will be received first and then the authentication credential can be requested from the agent, among other such options. The validity of the authentication credential can be verified 312, as well as permission to access (or receiving information derived from) the restricted content. Upon such verification, a view of (or derived from) the restricted content can be rendered 314 corresponding to the request. An image, or set of image data, corresponding to the view can then be provided 316 for display or presentation on the client device by the browser application. In this example, none of the underlying data is transmitted to the browser application, such that the only information available to the browser is represented in the image data. The authentication credential, being the same or an updated version, is also provided 318 to be stored by the agent to the secure location on the client device. This can also be sent together or separate from the image data, as may be managed by the agent on the client device such that the authentication credential, and any other sensitive data, is not available to the browser application on the client device.

Figure 4:
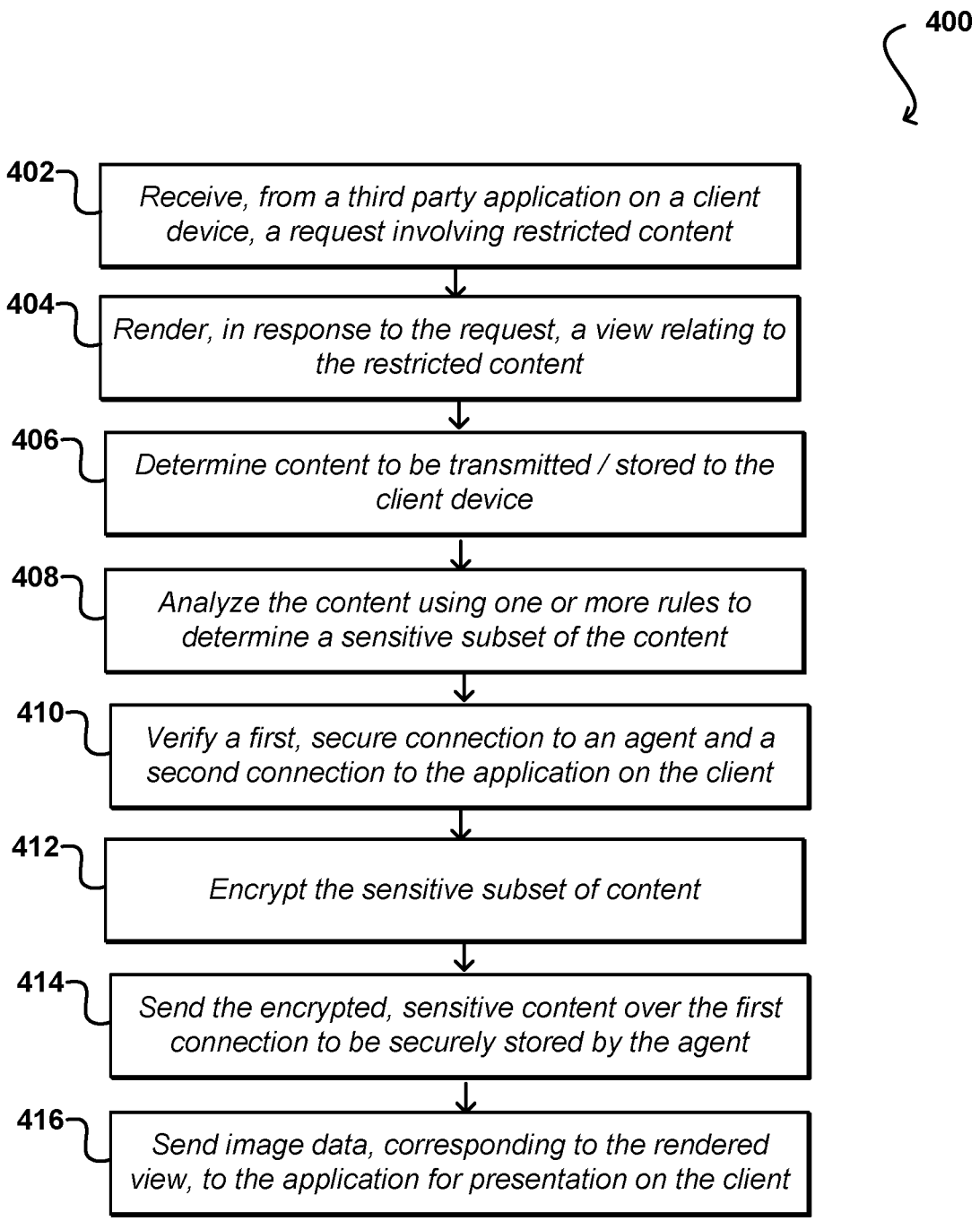
FIG. 4 illustrates an example process for managing sensitive data that can be utilized in accordance with various embodiments.

FIG. 4 illustrates an example process 400 for managing data stored to a potentially unsecure device that can be utilized in accordance with various embodiments. In this example, a request involving restricted content is received 402 from a third party application on a client device. Although not mentioned in this example, one or more authentication criteria may need to be received along with the request, such as is discussed with respect to the process of FIG. 3. In response to the request, a view relating to the restricted content can be rendered 404. The rendering of restricted data on the server side, or otherwise remote from the client device, can prevent the need for any of the restricted data to be transmitted to the client device except as otherwise determinable from the rendered image data. It might be the case, however, that at least some content is to be transmitted to, and/or stored by, the client device. This can include authentication credentials or other data that is to be either transmitted to the third party application or stored on the client device, among other such options. The content to be transmitted to the device can be determined 406, and at least a portion of that content can be analyzed 408 to determine at least a subset of that content that is determined to be sensitive content. As used in this example, sensitive content refers at least to data that is not to be made accessible to the third party application on the client device, but can also refer to content that is not to be accessible, at least in an unencrypted form, to various other applications or components on the client device as well.

The rendered image data and content can then be transmitted to the client device. In order to transmit the data in this example, verification is performed 410 that a first, secure connection is available to the agent on the client device, as well as a second connection to the third party application. As mentioned, these can be part of the same connection in some embodiments, or can both go to the agent with a separate connection from the agent to the application, among other such options. In this example the sensitive data to be securely stored by the agent will be encrypted 412 before being transmitted to the agent, although the data may not be encrypted in other embodiments. The encrypted, sensitive content can be sent 414 over the first connection to the agent, whereby the agent is enabled to securely store the data on the client device, such as in a secure repository or partition. The rendered image data can also be sent 416 to the application, directly or through the agent, for presentation on the client device.

Figure 5:
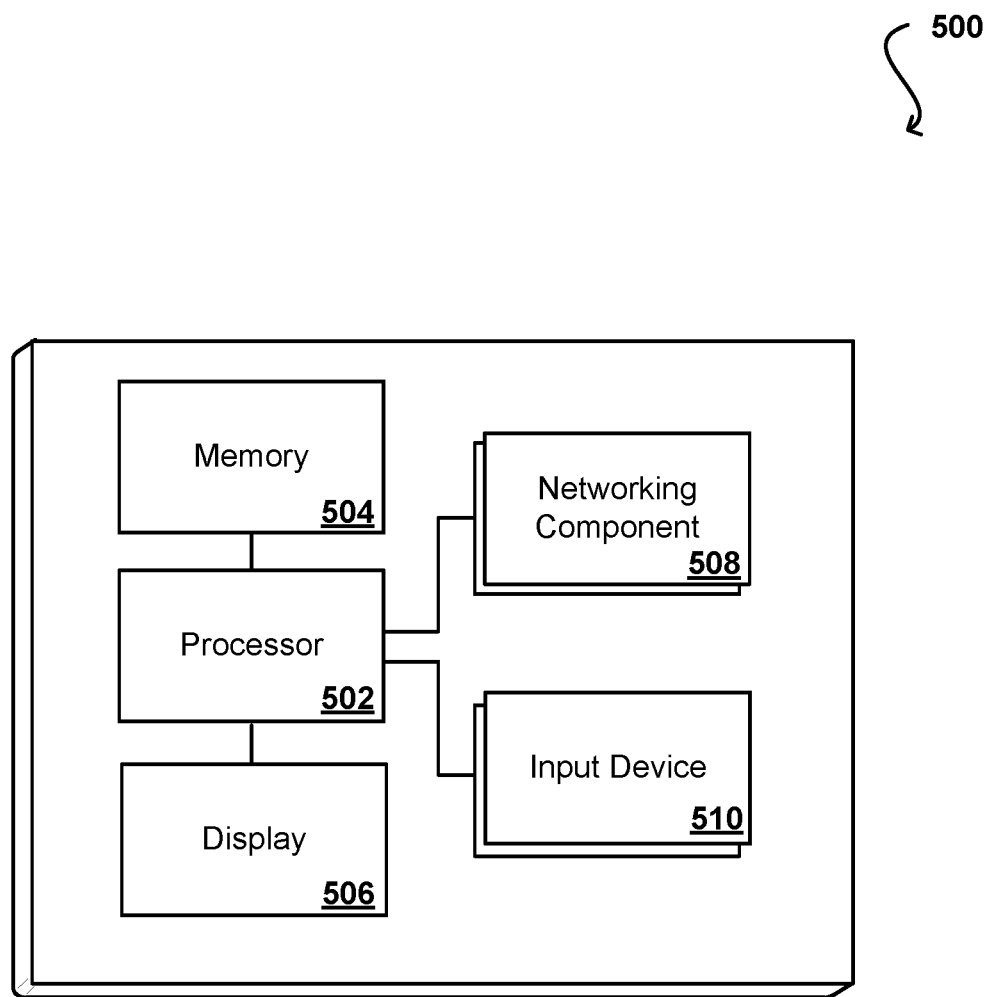
FIG. 5 illustrates example components of a computing device that can be used to implement aspects of various embodiments.

FIG. 5 illustrates a set of basic components of an example computing device 500 that can be utilized to implement aspects of the various embodiments. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the at least one processor 502, the same or separate storage can be used for images or data, a removable memory can be available for sharing information with other devices, and any number of communication approaches can be available for sharing with other devices. The device may include at least one type of display element 506, such as a touch screen, electronic ink (e-ink), organic light emitting diode (OLED) or liquid crystal display (LCD), although devices such as servers might convey information via other means, such as through a system of lights and data transmissions. The device typically will include one or more networking components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
  receiving, from a browser application executing on a client device, a request involving restricted content;
  receiving, from a security agent executing separate from the browser on the client device, an authentication credential;
  validating the authentication credential to determine permission to process the request;
  generating, based at least in part on decision logic accessible to a rendering server, a view of at least a portion of the restricted content derived from at least an underlying portion of the restricted content without including the underlying portion of the restricted content;

transmitting, using a first connection associated with the rendering server, image data, including the view, to the browser application on the client device without transmitting the underlying portion of the restricted content;

rendering, corresponding to the request, the image data to be displayed via the browser application on the client device;

providing, using a second connection to the security agent on the client device, the authentication credential for subsequent request authentication; and causing the security agent to store the authentication credential in encrypted form to a secure location on the client device, wherein the authentication credential is stored on behalf of, but inaccessible to, the browser application on the client device.

2. The computer-implemented method of claim 1, further comprising:

configuring a virtual private network (VPN) service to manage the first connection and the second connection through a single VPN connection between the client device and a content provider system.

3. The computer-implemented method of claim 1, further comprising:

providing the rendered image data to the browser application without separately providing, to the browser application, the restricted content used to generate the rendered image data, wherein the restricted content not visually represented in the rendered image data is not accessible through the browser application.

4. The computer-implemented method of claim 1, further comprising:

generating the authentication credential, the authentication credential including a username/password pair, a session token, an identity token, a secure cookie, a Kerberos ticket, or an identifier encrypted with an encryption key.

5. The computer-implemented method of claim 1, further comprising:

determining, using at least one security rule, additional data to be securely stored to the client device and inaccessible to the browser application; and providing the additional data to the security agent over the second connection for secure storage on the client device.

6. A computer-implemented method, comprising:

determining content to be provided by a content provider system, to a client device, on behalf of an application executing on the client device, the content including restricted data;

generating a first, secure connection between the content provider system and a security agent on the client device for providing the restricted data;

generating unrestricted data to be accessible to the client device, wherein the unrestricted data includes image data, and wherein the image data is a view of at least a portion of the restricted data derived from at least an underlying portion of the restricted content without including the underlying portion of the restricted data, the underlying portion of the restricted content being generated based at least in part on decision logic accessible to a renderer;

generating a second connection between the content provider system and the client device for providing the unrestricted data;

transmitting the unrestricted data to the client device to be accessible to the application via the second connection;

transmitting, to the security agent on the client device, the restricted data via the first connection, the first connection being associated with the renderer; and causing the security agent to store the restricted data in encrypted form to a secure location on the client device, wherein the encrypted restricted data is stored on the client device but inaccessible to the application.

7. The computer-implemented method of claim 6, further comprising:

receiving, from the application, a request for the content;

receiving, from the security agent, an authentication credential, the authentication credential being stored to the secure location as part of the restricted data; and validating the authentication credential before providing the restricted data.

8. The computer-implemented method of claim 7, further comprising:

providing, as part of the subset of restricted data, the authentication credential to be stored to the secure location by the security agent, the authentication credential being a current version of the authentication credential and capable of being submitted with future requests, on behalf of the application, involving restricted data.

9. The computer-implemented method of claim 7, further comprising:

generating the authentication credential, the authentication credential including a username/password pair, a session token, an identity token, a cookie, a Kerberos ticket, or an identifier encrypted with an encryption key.

10. The computer-implemented method of claim 6, further comprising:

generating the first, secure connection and the second connection as part of a single VPN connection between the content provider system and the client device.

11. The computer-implemented method of claim 6, further comprising:

configuring a proxy for managing routing of the first, secure connection and the second connection.

12. The computer-implemented method of claim 6, further comprising:

providing the unrestricted data to the application as pre-rendered image data without separately providing, to the application, any of the restricted content used to generate the pre-rendered image data.

13. The computer-implemented method of claim 6, further comprising:

determining, using at least one security rule, additional data to be securely stored to the client device and inaccessible to the application; and providing the additional data to the security agent for secure storage on the client device.

14. The computer-implemented method of claim 6, further comprising:

obtaining, from a key management service, an encryption key to be used to encrypt the restricted data before storage on the client device.

15. The computer-implemented method of claim 6, wherein the application is an email client and the unrestricted content corresponds to email content, and further comprising:

causing the security agent to store an access credential as part of the restricted data; and causing the security agent to present the access credential to an email server for purposes of enabling the email client to access the email content.

16. A non-transitory computer-readable storage medium storing instructions that, when executed by at least one processor of a computing device, cause the computing device to:
- receive restricted content over a first channel to a security agent on the client device;
- cause the security agent to store the restricted content in encrypted form to a secure location on the client device, the secure location being inaccessible to the application;
- receive unrestricted content to be accessible to an application executing on the computing device via a second channel, wherein the unrestricted content includes a view of at least an underlying portion of the restricted content without including the underlying portion of the restricted content, the underlying portion of the restricted content being generated based at least in part on decision logic accessible to a renderer;
- store the unrestricted content to application-accessible storage on the client device; and
- cause the security agent to present the restricted content on behalf of the application using a connection associated with the renderer.

17. The non-transitory computer-readable storage medium of claim 16, wherein the instructions when executed further cause the computing device to:
- display a pre-rendered image received as part of the unrestricted content, the pre-rendered image generated using the view of the restricted data.

18. The non-transitory computer-readable storage medium of claim 16, wherein the restricted data includes a username/password pair, a session token, an identity token, a cookie, a Kerberos ticket, or an identifier encrypted with an encryption key.

19. The non-transitory computer-readable storage medium of claim 16, wherein the instructions when executed further cause the computing device to:
- establish the first connection with the second connection for the unrestricted content as part of a single VPN connection between the content provider system and the client device; or
- configure a proxy for managing routing of the secure connection and the unsecure connection.

* * * * *